United States Patent
Kondajeri et al.

(10) Patent No.: US 7,325,163 B2
(45) Date of Patent: Jan. 29, 2008

(54) ERROR MONITORING OF PARTITIONS IN A COMPUTER SYSTEM USING SUPERVISOR PARTITIONS

(75) Inventors: Preetha R. Kondajeri, Bangalore (IN); Ravi K. Kulkarni, Karnataka (IN); Manish Misra, Karnataka (IN)

(73) Assignee: International Business Machines Corporation, Armonk, NY (US)

( * ) Notice: Subject to any disclaimer, the term of this patent is extended or adjusted under 35 U.S.C. 154(b) by 532 days.

(21) Appl. No.: 11/029,780

(22) Filed: Jan. 4, 2005

(65) Prior Publication Data

US 2006/0149995 A1    Jul. 6, 2006

(51) Int. Cl.
*G06F 11/00* (2006.01)
(52) U.S. Cl. .............................. 714/25; 714/48; 714/49
(58) Field of Classification Search .................. 714/25, 714/48, 49
See application file for complete search history.

(56) References Cited

U.S. PATENT DOCUMENTS

| | | | |
|---|---|---|---|
| 6,438,671 B1 | 8/2002 | Doing et al. | |
| 6,567,897 B2 | 5/2003 | Lee et al. | |
| 6,658,591 B1 | 12/2003 | Arndt | |
| 6,701,464 B2 * | 3/2004 | Austen et al. | 714/48 |
| 6,842,870 B2 * | 1/2005 | Austen et al. | 714/48 |
| 6,920,587 B2 * | 7/2005 | Dawkins et al. | 714/48 |
| 2002/0124215 A1 * | 9/2002 | Austen et al. | 714/57 |
| 2006/0212750 A1 * | 9/2006 | Denninghoff et al. | 714/6 |

* cited by examiner

*Primary Examiner*—Bryce P Bonzo
(74) *Attorney, Agent, or Firm*—Schmeiser, Olsen & Watts; William H. Steinberg

(57) ABSTRACT

A method and computer program product for error monitoring partitions in a computer system. A global supervisor mapping (GSM) associates each supervised partition with a supervisor partition that monitors the supervised partition. A partition status buffer (PSB) denotes a status (GOOD, BAD, NOCARE) of the partition. The BAD status denotes that the partition has encountered at least one error that is currently unrepaired. The supervisor partition determines its supervised partition from the GSM and ascertains the status of its supervised partition from the PSB. If the status of the supervised partition is BAD then a recovery procedure is performed by the supervisor partition. The recovery procedure: obtains a grant of access to physical and logical resources of the supervised partition which contains error data of the supervised partition; gathers the error data; and sets the status of the supervised partition to the NOCARE status.

15 Claims, 11 Drawing Sheets

| ENTRY ITEM | DESCRIPTION |
|---|---|
| PI | PARTITION IDENTIFIER |
| ED | ERROR DESCRIPTOR |

24 (GLOBAL SUPERVISOR MAPPING)

| SUPERVISED PARTITION | SUPERVISOR PARTITION |
|---|---|
| 1 | 2 |
| 2 | 3 |
| 3 | 4 |
| ⋮ | ⋮ |
| 20 | 1 |

*FIG. 7*

26 (PARTITION STATUS BUFFER)

| PARTITION | STATUS |
|---|---|
| 1 | GOOD |
| 2 | GOOD |
| 3 | BAD |
| ⋮ | ⋮ |
| 20 | NOCARE |

*FIG. 8*

ERROR MONITORING OF PARTITIONS IN A COMPUTER SYSTEM USING SUPERVISOR PARTITIONS

BACKGROUND OF THE INVENTION

1. Technical Field

The present invention relates to error monitoring of partitions in a computer system 2. Related Art In a data processing system with plurality of partitions, if a partition has stopped due to error(s), information about the nature and cause of the error(s) is not immediately or soon available. Hence a successful recovery from the error(s) may be difficult or may have to be postponed till the next successful reboot of the partition. Thus, there is a need for a method that promotes timely recovery of the partition from the error(s).

SUMMARY OF THE INVENTION

The present invention provides a method for error monitoring of a plurality of partitions in a computer system, each partition having its own operating system, said computer system comprising a hypervisor that mediates between or among said operating systems, said method comprising executing a computer readable program code stored on at least one computer usable medium of the computer system, said executing comprising:

providing a global supervisor mapping (GSM) that associates each partition with a supervisor partition selected from the plurality of partitions in a one-to-one mapping;

providing a partition status buffer (PSB) for each partition of the plurality of partitions, said partition status buffer denoting a status of the partition, said status being selected from a group of statuses that comprises a BAD status and a NOCARE status, said BAD denoting that the partition has encountered at least one error that is currently unrepaired;

determining, by a first supervisor partition of the supervisor partitions, the partition that is associated with the first supervisor partition in the global supervisor mapping, said partition associated with the first supervisor partition being denoted as a supervised partition;

ascertaining, from the partition status buffer, the status of the supervised partition;

if said ascertaining ascertains that the status of the supervised partition is not the BAD status then exiting from the method, else performing a recovery procedure comprising:

obtaining by the first supervisor partition a grant of access to physical and logical resources of the supervised partition;

gathering by the first supervisor partition error data relating to the supervised partition, said gathering being from said physical and logical resources of the supervised partition; and setting the status of the supervised partition to the NOCARE status in the partition status buffer.

The present invention provides a computer program product, comprising at least one computer usable medium having a computer readable program code embodied therein, said computer readable program code comprising an algorithm adapted to implement a method for monitoring a plurality of partitions in a computer system, each partition having its own operating system, said computer system comprising a hypervisor that mediates between or among said operating systems, said method comprising:

providing a global supervisor mapping (GSM) that associates each partition with a supervisor partition selected from the plurality of partitions in a one-to-one mapping;

providing a partition status buffer (PSB) for each partition of the plurality of partitions, said partition status buffer denoting a status of the partition, said status being selected from a group of statuses that comprises a BAD status and a NOCARE status, said BAD denoting that the partition has encountered at least one error that is currently unrepaired;

determining, by a first supervisor partition of the supervisor partitions, the partition that is associated with the first supervisor partition in the global supervisor mapping, said partition associated with the first supervisor partition being denoted as a supervised partition;

ascertaining, from the partition status buffer, the status of the supervised partition;

if said ascertaining ascertains that the status of the supervised partition is not the BAD status then exiting from the method, else performing a recovery procedure comprising:

obtaining by the first supervisor partition a grant of access to physical and logical resources of the supervised partition;

gathering by the first supervisor partition error data relating to the supervised partition, said gathering being from said physical and logical resources of the supervised partition; and setting the status of the supervised partition to the NOCARE status in the partition status buffer.

The present invention advantageously promotes timely recovery of a partition of a computer system from an error relating to the partition.

BRIEF DESCRIPTION OF THE DRAWINGS

FIG. 7 illustrates the global supervisor mapping of FIG. 4, in accordance with embodiments of the present invention.

FIG. 8 illustrates the partition status buffer of FIG. 2, in accordance with embodiments of the present invention.

DETAILED DESCRIPTION OF THE INVENTION

The present invention describes a partition error monitoring method that includes detecting and reporting partition errors. Said errors may cause the partition to fail (i.e., become inoperative). FIGS. 1-9 describe hardware, software, and data structures which are fundamental to the present invention. FIGS. 10-13 depict flow charts which collectively describe methods of the present invention for an error monitoring of partitions in a computer system.

Figure 1:
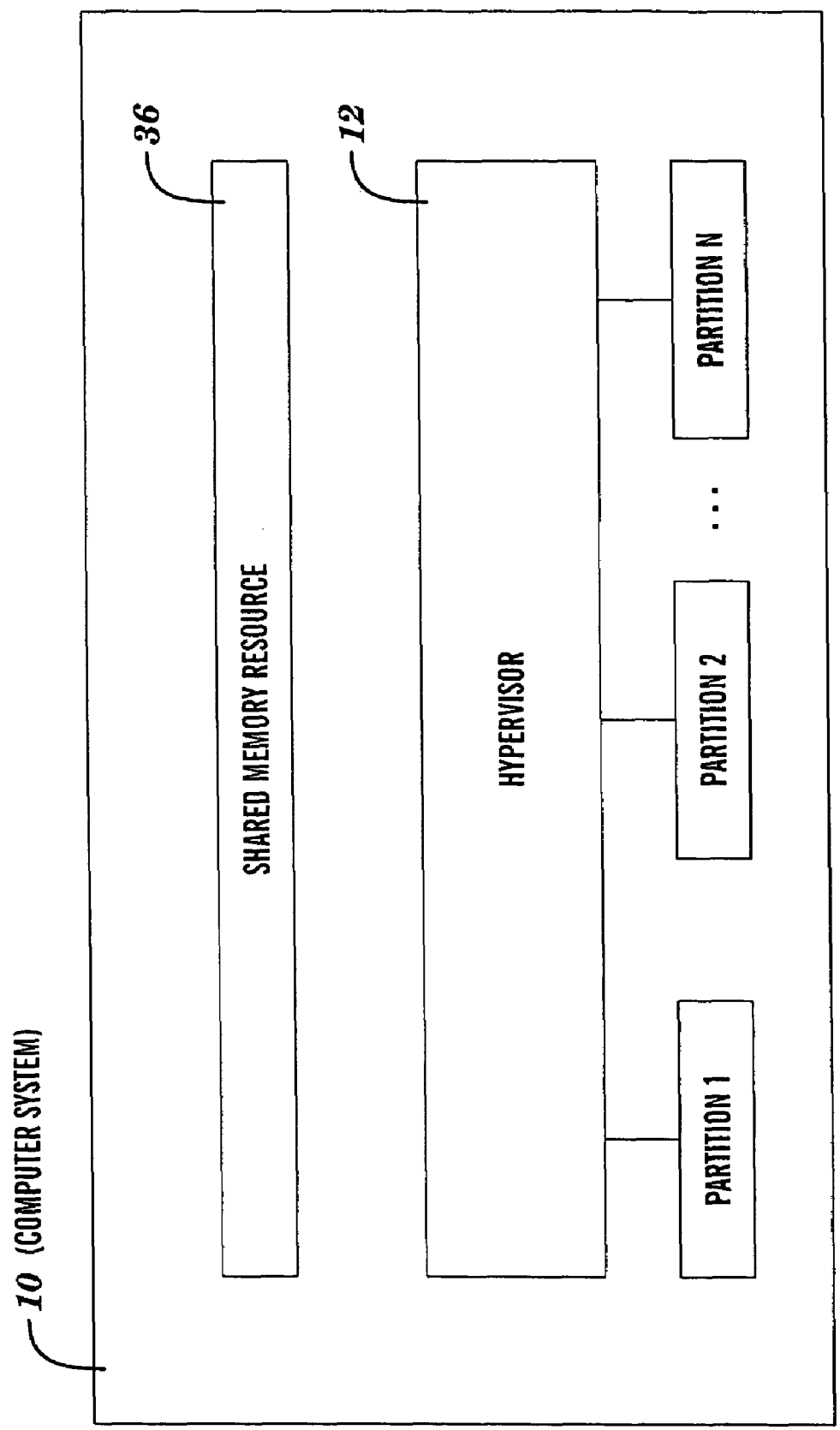
FIG. 1 illustrates partitions, a hypervisor, and a shared memory resource of a computer system, in accordance with embodiments of the present invention.

FIG. 1 illustrates N partitions, a hypervisor 12, and a shared memory resource 36, of a computer system 10, in accordance with embodiments of the present invention. The computer system 10 also has a hardware configuration (i.e., processor, memory devices, input/output devices, etc.) such as, inter alia, the hardware configuration shown in the computer system 90 in FIG. 9, described infra. In -FIG. 1, the partitions are denoted as partition 1, partition 2, . . . , partition N, wherein N is at least 2. Each partition shares resources (processor, memory, input/output, etc.) of the overall computer system 10 such that the partition is adapted to functions as an autonomous computer system having its own operating system. The hypervisor 12 mediates data movement between the partitions, controls data access between the partitions, and protect one partition's memory from corruption by errors in other partitions. The hypervisor 12 is used in conjunction with the partition error monitoring method of the present invention, as will be described infra.

The shared memory resource 36 may comprise, inter alia, a Non Volatile Random Access Memory (NVRAM). The shared memory resource 36 is outside of the N partitions and is shared by the N partitions. The content of the shared memory resource 36 will be described infra in conjunction with FIG. 4.

Each partition has a status, selected from a group of statuses comprising a GOOD status, a BAD status, and a NOCARE status. At any given time, a partition has exactly one status. The status of each partition is stored in the partition status buffer (PSB) 26 of FIGS. 2 and 8, as described infra. A partition having the GOOD status has not encountered an error that is currently unrepaired. A partition having the BAD status has encountered at least one error that is currently unrepaired. A partition having the NOCARE status has been assigned the NOCARE status (see step 64 of FIG. 12, described infra) in response to a determination that the partition has the BAD status (see step 53 of FIG. 11, described infra). An event scanning routine of a partition having the NOCARE status will not execute the algorithm of FIG. 13, wherein FIG. 13 is described infra. Thus, a partition having encountered at least one error that is currently unrepaired may have either the BAD status (prior to execution of step 64 of FIG. 12) or the NOCARE status (upon execution of step 64 of FIG. 12). Upon repair of the at least one error encountered by a partition having the NOCARE status, the partition is assigned the GOOD status which replaces the NOCARE status.

Figure 2:
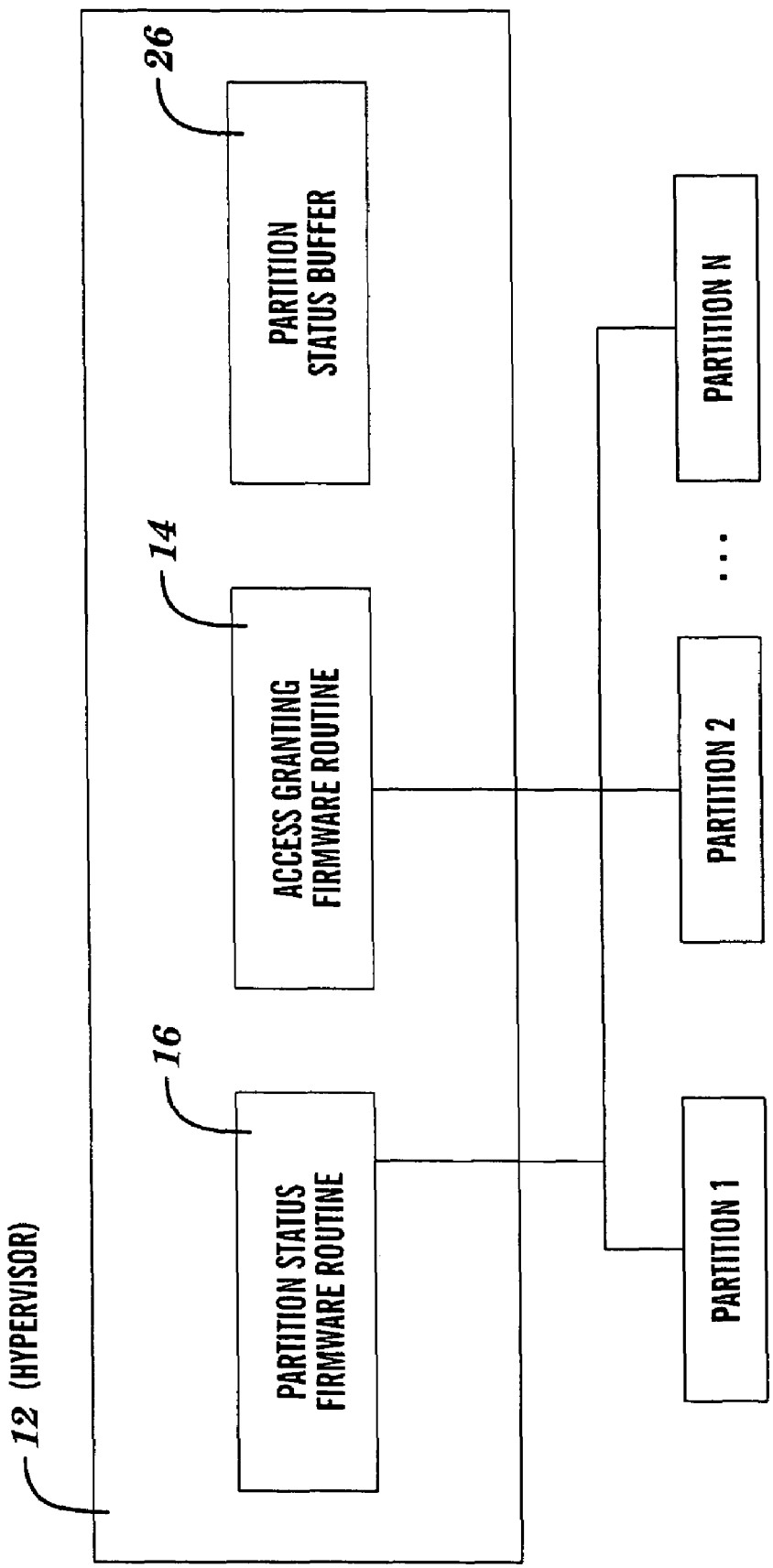
FIG. 2 illustrates the hypervisor of FIG. 1, in accordance with embodiments of the present invention.

The status of each partition is stored in a partition status buffer 26 within the hypervisor 12 (see FIG. 2, described infra). The partition status buffer 26 includes N storage areas respectively corresponding to the N partitions, such that storage area K of the N storage areas stores the status of partition K for K=1, 2, . . . , N. FIG. 8 depicts an example of the partition status buffer 26 for a case of 20 partitions (i.e., N=20), wherein the status (GOOD, BAD, or NOCARE) of each of the 20 partitions is stored, in accordance with embodiments of the present invention. The statuses stored in the partition status buffer 26 may be in any format. For example, the N storage areas may each encompass one byte of memory for each partition. Each such byte of memory consists of enough bits to represent the maximum number of possible statuses (e.g., each byte consists of at least 2 bits for the 3 statuses of GOOD, BAD, and NOCARE which may respectively be represented as 00, 01, and 02). As another example, the statuses may be represented by character strings (e.g., the statuses of GOOD, BAD, and NOCARE may be represented as "G", "B", or "N", respectively, or as "GOOD", "BAD", or "NOCARE", respectively). When the computer system 10 (see FIG. 1) is booted, the status of the N partitions are initially assigned to the partition status buffer 26 by the hypervisor 12. The partition status buffer 26 is updated when a change in the status of a partition is detected by the hypervisor 12.

In the present invention, each partition is supervised (i.e., monitored) by another partition called "the supervisor partition". In other words, a "supervisor partition" supervises (i.e., monitors) the "supervised partition" to determine which status (e.g., GOOD, BAD, or NOCARE) the supervised partition has. There may be a one-to-one correspondence (i.e., mapping) between the supervised partitions and the associated supervisor partitions, as designated in a global supervisor mapping (GSM) 24 within the shared memory resource 36 of FIG. 4, described infra. The global supervisor mapping 24 may be expressed in any format such as an algorithm or a data structure. The algorithm is adapted to generate the mapping relationships between supervised partitions and corresponding supervisor partitions in the global supervisor mapping 24. The data structure may comprise a file, table, algorithm, etc. For example, FIG. 7, illustrates the global supervisor mapping 24 as a table showing an exemplary one-to-one relationship between the supervised partitions and the associated supervisor partitions, in accordance with embodiments of the present invention. The global supervisor mapping 24 depicted in FIG. 7 is an embodiment of an "ascending sequential partition number mapping". The global supervisor mapping 24 in FIG. 7 may be changed dynamically for any reason such as, inter alia, to account for a partition that goes down and can no longer serve as a supervisor partition. For example, the global supervisor mapping 24 in FIG. 7 may be changed dynamically when a partition acquires the BAD status. As another example, the global supervisor mapping 24 in FIG. 7 may be changed dynamically to a more general embodiment of an "ascending sequential partition number mapping", wherein supervisor partitions are assigned dynamically from lower to higher number such that the next higher number partition becomes the supervisor for the previous lower number GOOD partition (i.e., a partition having the GOOD status), and the highest number GOOD partition has the lowest number GOOD partition as its supervisor.

FIG. 2 illustrates the hypervisor 12 of FIG. 1, in accordance with embodiments of the present invention. The hypervisor 12 comprises the partition status buffer 26 (described supra), a partition status firmware routine 16, and an access granting firmware routine 14. The partition status buffer 26 ascertains the status (e.g., GOOD, BAD, NOCARE) of partitions 1, 2, . . . , N in accordance with step 52 of FIG. 11, described infra. The hypervisor 12 further comprises an access granting firmware routine 14 that grants access to a "supervisor" partition (which may be any of partitions 1, 2, . . . , N) to resources of a "supervised" partition in accordance with step 61 of FIG. 12, described infra.

Figure 3:
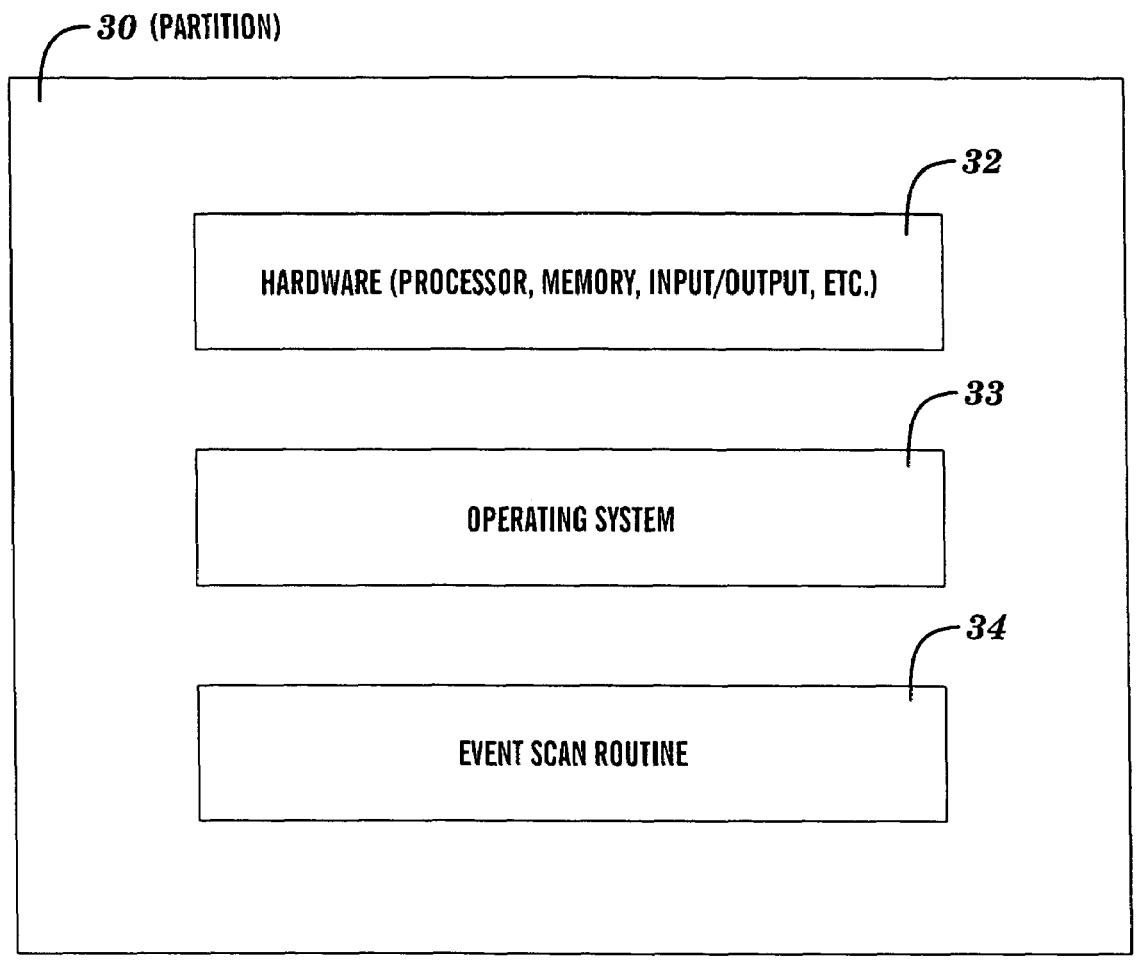
FIG. 3 illustrates a partition of FIG. 1, in accordance with embodiments of the present invention.

FIG. 3 illustrates a partition 30 representing any partition of the N partitions of FIG. 1, in accordance with embodiments of the present invention. The partition 30 comprises, inter alia, hardware 32, an operating system 33, and an event scan routine 34. The hardware 32 (i.e., processor, memory, input/output, etc.) is sufficient, together with necessary software, to enable the partition 30 to function as an autonomous computer system. The hardware 32 of the partition 30 will be related to hardware of a computer system 90 in a discussion infra of FIG. 9. The operating system 33 is part of a software package that, together with the hardware 32, enables the partition 30 to function as an autonomous computer system. The event scan routine 34 is used in conjunction with the partition error monitoring method of the present invention, as will be described infra.

Figure 4:
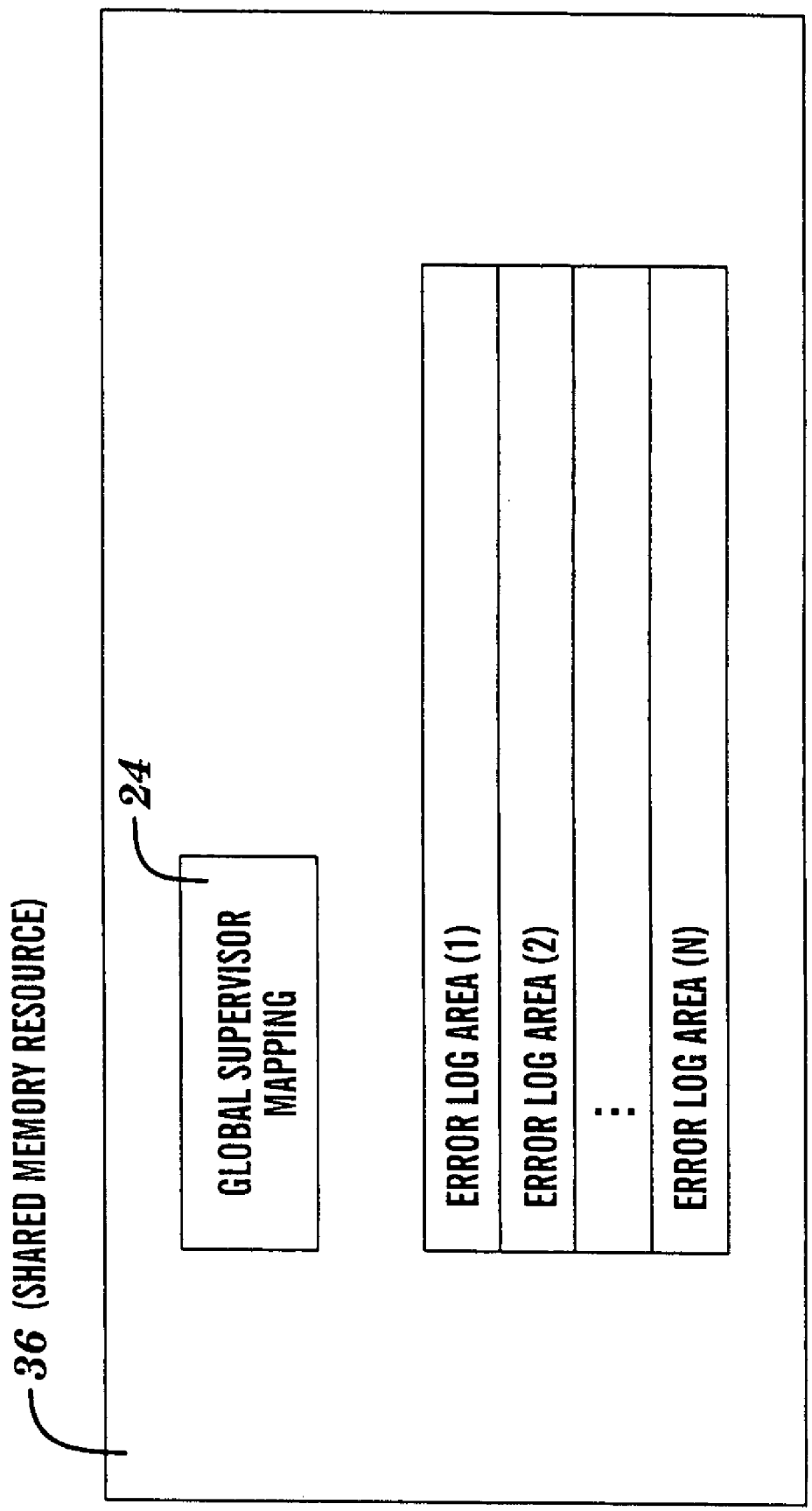
FIG. 4 illustrates the shared memory resource of FIG. 1 which comprises a global supervisor mapping and error log areas, in accordance with embodiments of the present invention.

FIG. 4 illustrates the shared memory resource 36 of FIG. 1. The shared memory resource 36 comprises a global supervisor mapping 24 and N error log areas (ELAs), in accordance with embodiments of the present invention. The shared memory resource 36 may comprise a storage area of one physical data storage device for storing the global supervisor mapping 24 and the N error log areas. The shared memory resource 36 may alternatively store the global supervisor mapping 24 and the N error log areas in storage areas of a plurality of physical data storage devices. FIG. 7 provides an example illustrating the global supervisor mapping 24, described supra.

In FIG. 4, the N error log areas are denoted as Error Log Area(1), Error Log Area(2), . . . , Error Log Area(N) which are respectively associated with Partition 1, Partition 2, . . . , Partition N of FIG. 1. The Error Log Area(1) comprises information relating to one or more errors previously detected for partition I (wherein I=1, 2, . . . , N) and/or one or more errors relating to a failed partition supervised by partition I as described infra. The N error log areas in FIG. 4 may each be in any data format that stores data (i.e., file format, record format, etc.). Each of the N error log areas in FIG. 4 may be stored contiguously within the shared memory resource 36. The N error log areas in FIG. 4 may alternatively be stored non-contiguously within the shared memory resource 36 (e.g., with a fixed address offset for successive error entries, via a pointer from an error entry to a next successive error entry, etc.). The content of each of the N error log areas is disclosed infra in conjunction with FIGS. 5 and 6.

Figures 5, 6:
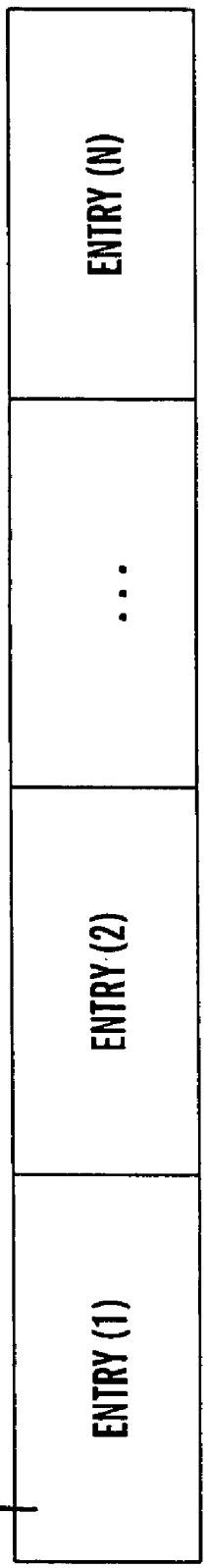
FIG. 5 illustrates an error log area of FIG. 4 having error entries therein, in accordance with embodiments of the present invention.
FIG. 6 depicts content in an error entry of FIG. 5, in accordance with embodiments of the present invention.

FIG. 5 illustrates an error log area (ELA) 38 representing any of the N error log areas of FIG. 4, in accordance with embodiments of the present invention. The error log area 38 has M error entries Entry(1), Entry(2), . . . , Entry (M), wherein M=0 or M is a positive integer. If M=0 then the error log area 38 is empty; i.e., the error log area 38 does not comprise any error entries. The M error entries in FIG. 5 may be in any data format that stores data (i.e., file format, record format, Common Hardware Reference Platform (CHRP) format, etc.) and distributed contiguously or non-contiguously within the error log area 38. Each error entry in the error log area 38 pertains to a single detected error condition in the partition associated with the error log area 38. The single detected error condition may pertain to an error in a partition causing the partition to fail, or to an error in the partition not causing the partition to fail.

FIG. 6 depicts data content in any of the M error entries of FIG. 5, in accordance with embodiments of the present invention. FIG. 6 shows that the error entry comprises the items of: partition identifier (PI) and error descriptor (ED). The items of PI and ED may be distributed contiguously or non-contiguously within the error log area 38. The partition identifier (PI) identifies the partition having the detected error. The error descriptor (ED) describes the detected error for the partition. The error descriptor may be in any format for describing the detected error. For example, the error descriptor may consist of a single ASCII character that stands for a particular error condition. As another example, the error descriptor may comprise a first part identifying the error generally (e.g., a input/output error) and a second part containing text describing the error more specifically (e.g., power disabled to a specified input/output data storage device such as an optical disc drive).

Figure 9:
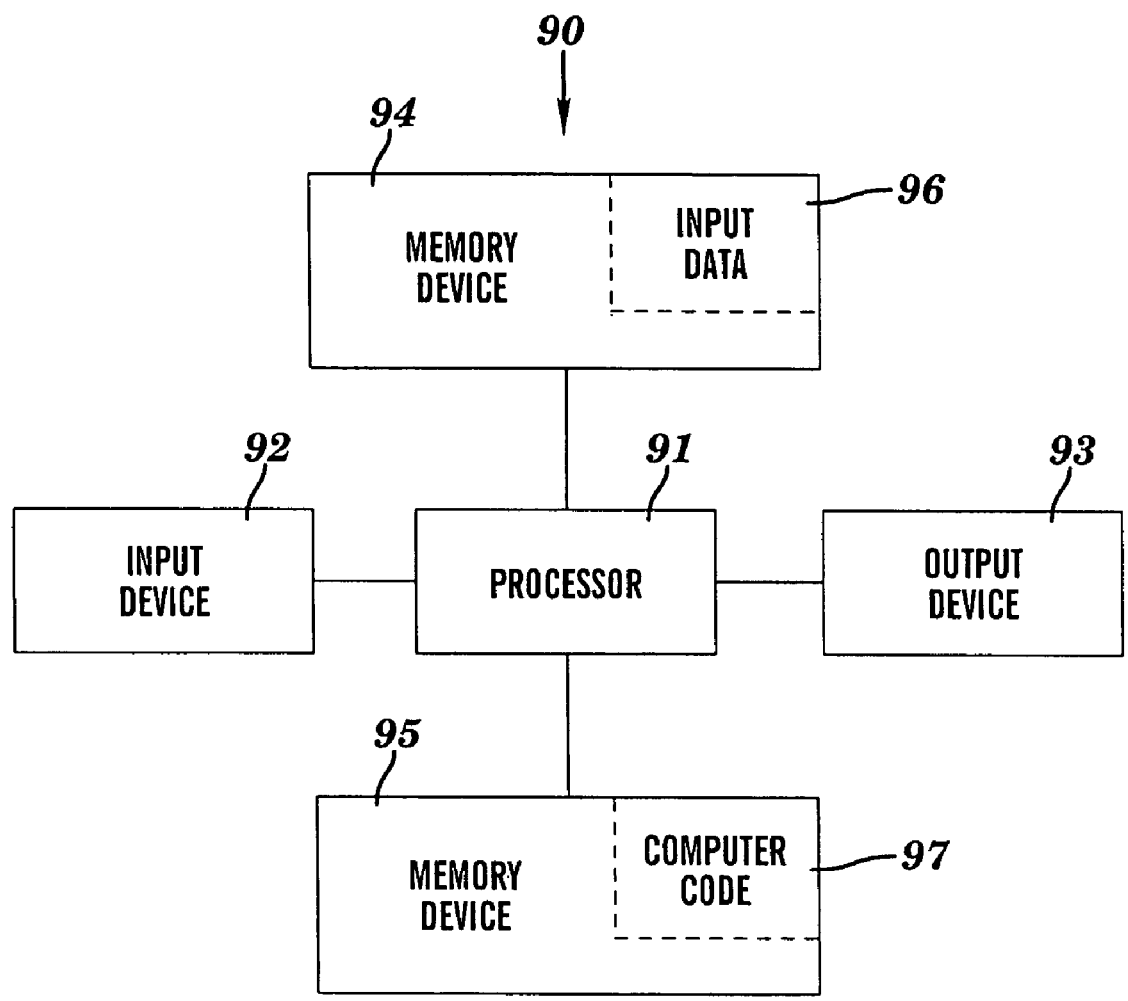
FIG. 9 illustrates a computer system used in conjunction with error monitoring of partitions, in accordance with embodiments of the present invention.

FIG. 9 illustrates a computer system used in conjunction with error monitoring of partitions, in accordance with embodiments of the present invention. The computer system 90 comprises the hardware 32 of the partition 30 of FIG. 3. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a mouse, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes an algorithm used in conjunction with error monitoring of partitions. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 9) may be used as a computer usable medium (or a computer readable medium or a program storage device) having a computer readable program code embodied therein and/or having other data stored therein, wherein the computer readable program code comprises the computer code 97. Generally, a computer program product (or, alternatively, an article of manufacture) of the computer system 90 may comprise said computer usable medium (or said program storage device). While FIG. 9 shows the computer system 90 as a particular configuration of hardware and software, any configuration of hardware and software, as would be known to a person of ordinary skill in the art, may be utilized for the purposes stated supra in conjunction with the particular computer system 90 of FIG. 9. For example, the memory devices 94 and 95 may be portions of a single memory device rather than separate memory devices.

The computer system 90 of FIG. 9 describes the hardware configuration of the overall computer system 10 of FIG. 1, wherein the overall computer system 10 of FIG. 1 comprises the N partitions, and wherein the computer code 97 in FIG. 9 represents any software used by the overall computer system 10 of FIG. 1 (e.g., the hypevisor 12 of FIG. 1). The computer system 90 of FIG. 9 also describes the hardware 32 of the partition 30 of FIG. 3, wherein the computer code 97 in FIG. 9 represents any software used by the partition 30 of FIG. 3 (e.g., the operating system 33 and event scan routine 34 in FIG. 3). Thus, the overall computer code or software that collectively implements the partition error monitoring method of the present invention may be in at least one computer usable medium. The N partitions of FIG. 1 may share some of the hardware resources shown in FIG.

9 (e.g., the shared memory resource 36 in FIG. 1, which may be represented by at least one of the memory devices 94 and 95 of FIG. 9).

FIGS. 10-13 depict flow charts collectively describing a method for error monitoring of partitions in a computer system, in accordance with embodiments of the present invention. The algorithms associated with FIGS. 10-13 are implemented by the computer code(s) 97 of FIG. 7.

Figure 10:
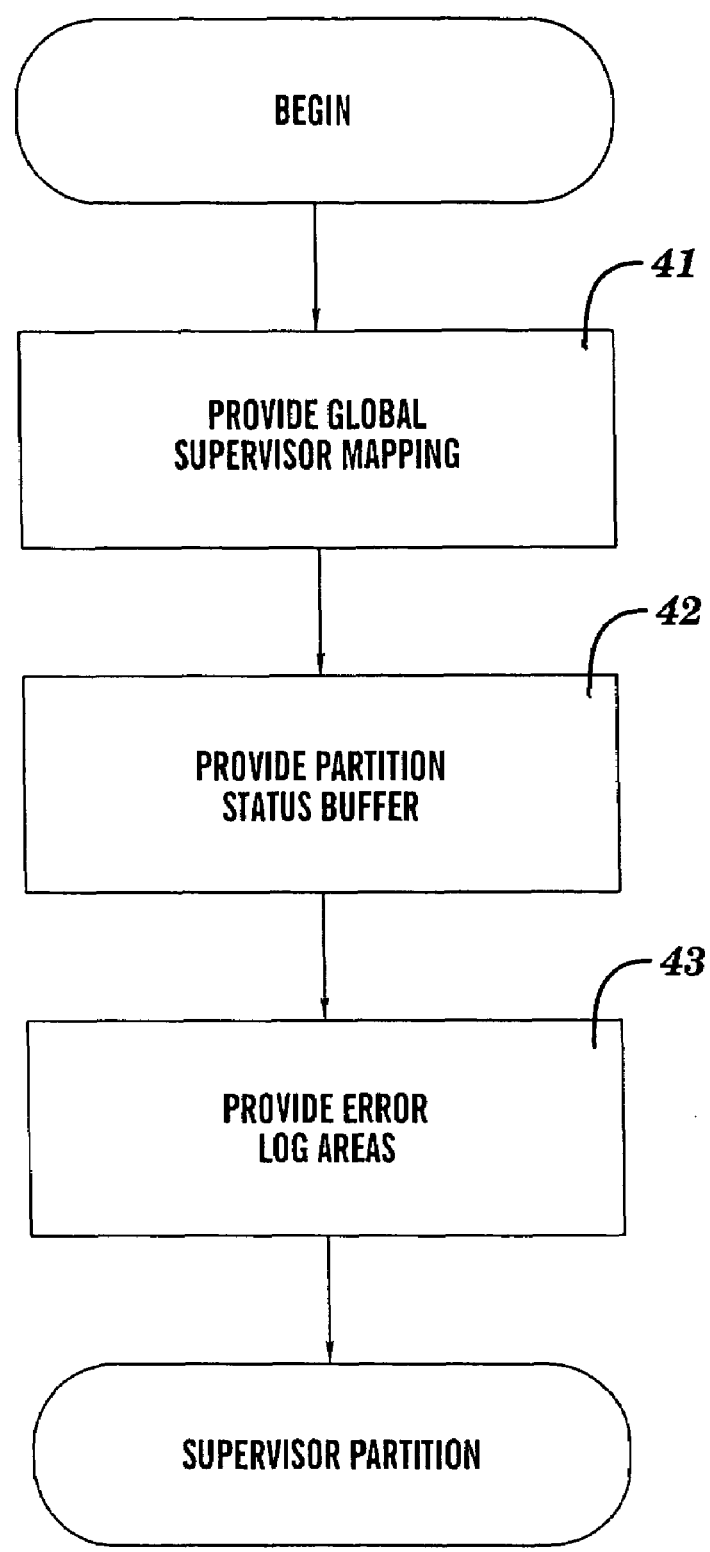
FIGS. 10-13 depict flow charts collectively describing a method for error monitoring of partitions in a computer system, in accordance with embodiments of the present invention.

FIG. 10 is a flow chart comprising steps 41-43 which initialize the partition error monitoring method of the present invention. Step 41 provides the global supervisor mapping 24 which has been described supra in conjunction with FIGS. 4 and 7. As explained supra, the global supervisor mapping 24 may be changed dynamically subsequent to being initially generated in step 41. Step 42 provides the partition status buffer 26 which has been described supra in conjunction with FIGS. 2 and 8. As explained supra, the partition status buffer 26 is updated when the status of a partition is detected by the hypervisor 12. Step 43 provides the N error log areas (i.e., Error Log Area(1), Error Log Area(2), . . . , Error Log Area(N)) which has been described supra in conjunction with FIGS. 4-6. After the initialization steps 41-43 of FIG. 10 are performed, each supervisor partition is periodically executed, or executed according to a scheduling algorithm, in accordance with FIG. 11.

Figure 11:
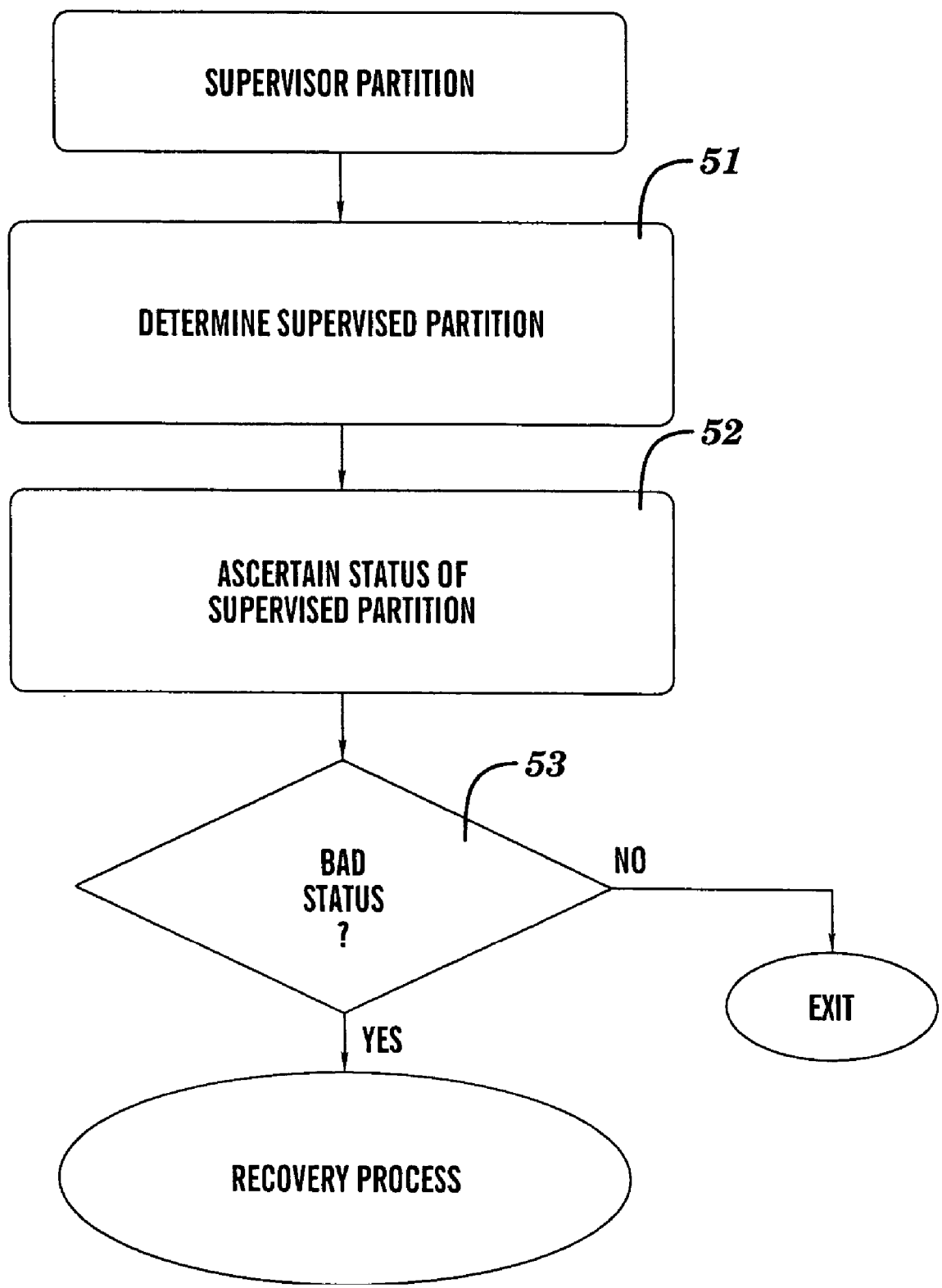

FIG. 11 is a flow chart comprising steps 51-53 which are executed by each supervisor partition. In step, 51 the supervisor partition invokes its event scanning routine to determine the supervised partition that the supervisor partition is assigned to supervise. The supervisor partition determines the supervised partition from the global supervisor mapping 24 (see FIGS. 4 and 7) by analyzing the global supervisor mapping 24 directly or by invoking a method (e.g., calling a subprogram of the hypervisor 12 of FIG. 1) to determine the supervised partition from an analysis of the global supervisor mapping 24.

In step 52 of FIG. 11, the supervisor partition ascertains the status (e.g., GOOD, BAD, or NOCARE status) of the supervised partition. To ascertain the status of the supervised partition, the event scanning routine of the supervisor partition invokes the partition status firmware routine 16 (see FIG. 2) of the hypervisor 12. The partition status firmware routine 16 ascertains the status of the supervised partition from analysis of the partition status buffer 26 (see FIGS. 2 and 8).

Step 53 determines whether or not the status of the supervised partition is the BAD status. If it is determined that the status of the supervised partition is not the BAD status, then the method of FIG. 12 exits. If it is determined that the status of the supervised partition is the BAD status, then the recovery process of FIG. 12 is next executed.

Figure 12:
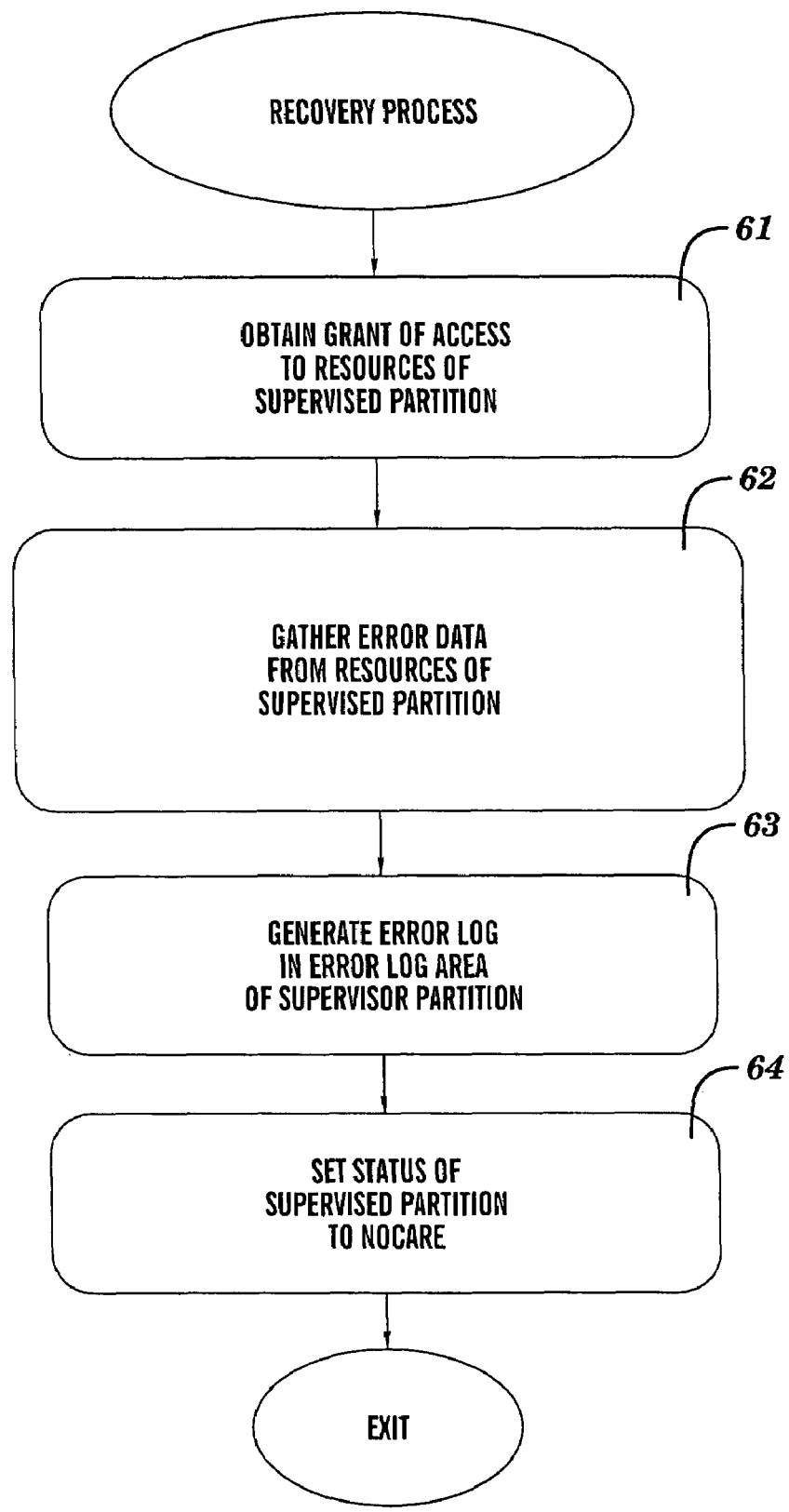
Figure 13:
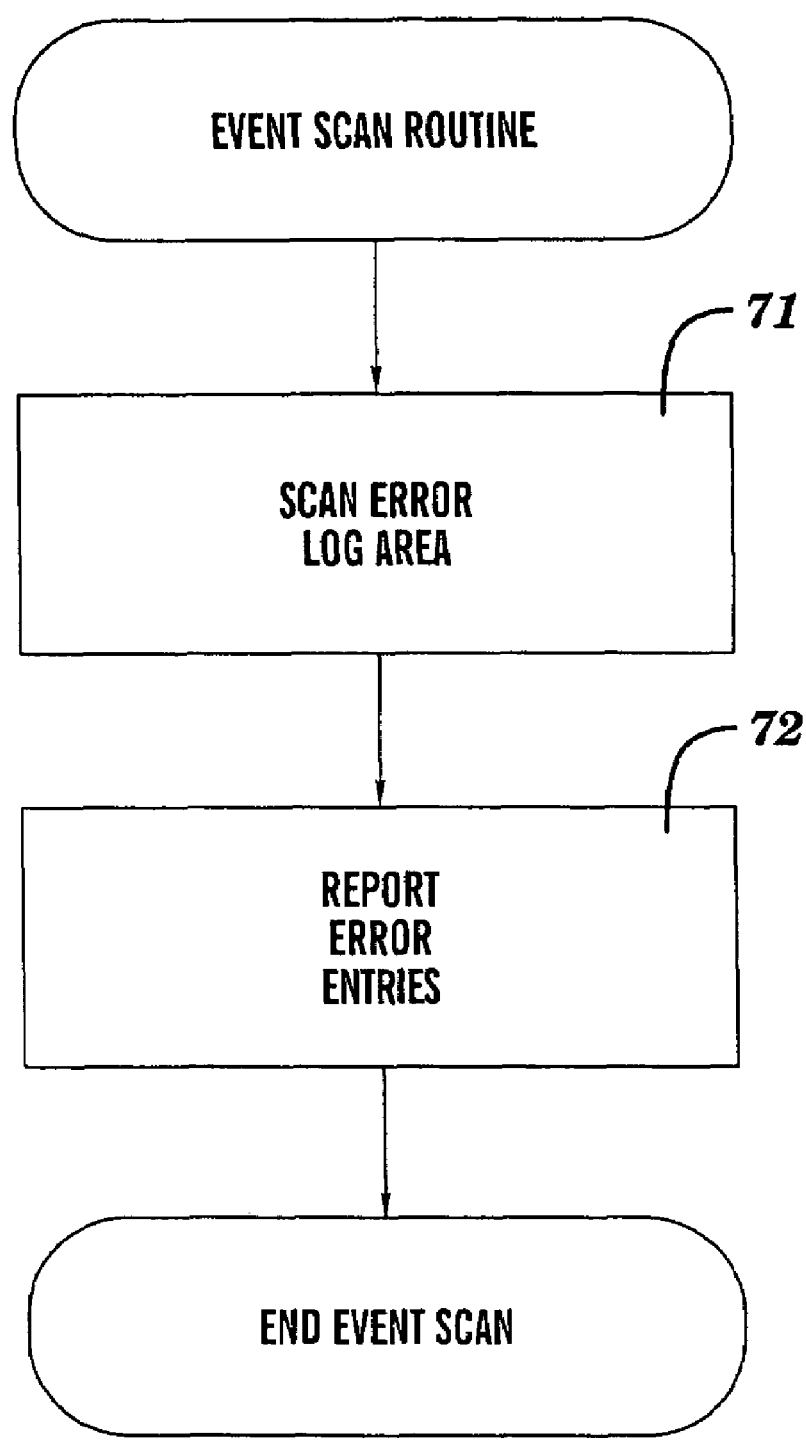

FIG. 12 is a flow chart comprising steps 61-64 for implementing a recovery process due to the determination in step 53 of FIG. 11 that the supervised partition has the BAD status, which means that the supervised partition has encountered at least one error that is currently unrepaired. The recovery process of FIG. 12 facilitates repair of said at least one error, by having the supervisor partition access pertinent data from resources of the supervised partition.

In step 61, the supervisor partition calls an access granting firmware routine 14 of the hypervisor 12 (see FIG. 2) to obtain a grant of access to physical and logical resources (e.g., memory, hardware registers, etc.) of the supervised partition. Upon being granted said access, the supervised partition enters a supervisory mode such that the supervisor partition is treated as a supervised partition by the hypervisor 12.

In step 62, the supervisor partition in the supervisory mode performs error checking by looking at the physical and logical resources (e.g., memory and registers) of the supervised partition having the BAD status. After gathering the relevant error data from the physical and logical resources (e.g., memory data and register dumps) of the supervised partition, the supervisor partition exits from the supervisory mode and transfers said error data to itself (i.e., to the supervisor partition).

In step 63, the supervisor partition generates an error log (e.g., in CHRP format or other applicable format) in the error log area of the supervisor partition. The generated error log includes information relating to the failed supervised partition as derived from the relevant error data gathered in step 62 from the physical and logical resources of the supervised partition. For example, the generated log may include, inter alia, a subset of the relevant error data gathered in step 62 and/or an identification thereof. The generated error log is utilized in conjunction with steps 71-72 of FIG. 13 as described infra.

In step 64, the supervisor partition sets the status of the supervised partition to the NOCARE status to prevent the supervisor partition from entering into the supervisory mode.

FIG. 13 is a flow chart comprising steps 71-72 which are executed by the error scan routine of the supervisor partition to obtain and report content from the entries in the error log area of the supervisor partition relating to the error log generated in step 63 of the recovery process in FIG. 12 as described supra.

Step 71 of FIG. 13 scans the error log area of the supervisor partition to find the error log of the supervised partition that had been generated in the error log area of the supervisor partition in step 63 of FIG. 12. Step 71 identifies error entries relating to the supervised partition.

Step 72 of FIG. 13 reports each error entry relating to the supervised partition (as determined from step 71) to the operating system of the supervisor partition. Said reporting of the error entries enables an administrator or user to take corrective action to fix the error that caused the supervised partition to acquire BAD status. This enables the detail of the errors in the error descriptor (ED) of the error entry (see FIG. 6) to be available soon after an error was encountered for the supervised partition.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method for error monitoring of a plurality of partitions in a computer system, each partition having its own operating system, said computer system comprising a hypervisor that mediates between or among said operating systems, said method comprising executing a computer readable program code stored on at least one computer usable medium of the computer system, said executing comprising:

providing a global supervisor mapping (GSM) that associates each partition with a supervisor partition selected from the plurality of partitions in a one-to-one mapping;

providing a partition status buffer (PSB) for each partition of the plurality of partitions, said partition status buffer denoting a status of the partition, said status being selected from a group of statuses that comprises a BAD status and a NOCARE status, said BAD denoting that the partition has encountered at least one error that is currently unrepaired;

determining, by a first supervisor partition of the supervisor partitions, the partition that is associated with the first supervisor partition in the global supervisor mapping, said partition associated with the first supervisor partition being denoted as a supervised partition;

ascertaining, from the partition status buffer, the status of the supervised partition;

if said ascertaining ascertains that the status of the supervised partition is not the BAD status then exiting from the method, else performing a recovery procedure comprising:

obtaining by the first supervisor partition a grant of access to physical and logical resources of the supervised partition;

gathering by the first supervisor partition error data relating to the supervised partition, said gathering being from said physical and logical resources of the supervised partition; and setting the status of the supervised partition to the NOCARE status in the partition status buffer.

2. The method of claim 1, wherein the method further comprises storing in an error log area of the first supervisor partition information relating to the error data gathered from said physical and logical resources of the supervised partition, said storing being performed by the first supervisor partition.

3. The method of claim 2, and wherein the method further comprises:

scanning the error log area of the first supervisor partition for an existence of one or more error entries comprising the information relating to the error data gathered from said physical and logical resources of the supervised partition; and reporting information comprising each error entry of the one or more error entries determined to exist by said scanning.

4. The method of claim 3, wherein each partition of the plurality of partitions has an event scanning routine, and wherein said scanning and reporting are performed by the event scanning routine of the first supervisor partition.

5. The method of claim 3, wherein said reporting comprises reporting said information to the operating system of the first supervisor partition.

6. The method of claim 1, wherein the method further comprises initializing the partition status buffer when the plurality of partitions are booted up.

7. The method of claim 1, wherein the method further comprises updating the partition status buffer when the status of a partition of the plurality of partitions is changed.

8. The method of claim 1, wherein the partition status buffer consists of one byte of memory for each partition of the plurality of partitions.

9. The method of claim 1, wherein said ascertaining comprises invoking by the first supervisor partition a partition status firmware routine of the hypervisor.

10. The method of claim 9, wherein each partition of the plurality of partitions has an event scanning routine, and wherein said invoking is performed by the event scanning routine of the first supervisor partition.

11. The method of claim 1, wherein that global supervisor mapping is an ascending sequential partition number mapping.

12. The method of claim 1, wherein the method further comprises changing the global supervisor mapping when a partition of the plurality of partitions acquires the BAD status.

13. The method of claim 1, wherein said obtaining the grant of access comprises invoking an access granting firmware routine of the hypervisor.

14. The method of claim 1, wherein the global supervisor mapping is embodied in a data structure, and wherein the data structure is located in a shared memory resource of the computer system.

15. The method of claim 14, wherein the shared memory resource comprises a Non Volatile Random Access Memory (NVRAM).

* * * * *